US010477289B2

(12) United States Patent
Steinkilberg et al.

(10) Patent No.: US 10,477,289 B2
(45) Date of Patent: Nov. 12, 2019

(54) SOUND GENERATING DEVICE ON A VEHICLE FOR REDUCING OR GENERATING ENGINE SOUND AND EXHAUST SYSTEM

(71) Applicant: Faurecia Emissions Control Technologies, Germany GmbH, Augsburg (DE)

(72) Inventors: Hannes Steinkilberg, Augsburg (DE); Juergen Klement, Asbach-Baeumenheim (DE)

(73) Assignee: Faurecia Emissions Control Technologies, Germany GmbH (DE)

( * ) Notice: Subject to any disclaimer, the term of this patent is extended or adjusted under 35 U.S.C. 154(b) by 44 days.

(21) Appl. No.: 15/484,214

(22) Filed: Apr. 11, 2017

(65) Prior Publication Data

US 2017/0303022 A1 Oct. 19, 2017

(30) Foreign Application Priority Data

Apr. 15, 2016 (DE) ........................ 10 2016 107 069

(51) Int. Cl.
*H04B 1/08* (2006.01)
*H04R 1/02* (2006.01)

(52) U.S. Cl.
CPC ....... *H04R 1/025* (2013.01); *H04R 2201/029* (2013.01); *H04R 2499/13* (2013.01)

(58) Field of Classification Search
CPC ..... F01N 1/065; F01N 13/1888; G10K 11/16; G10K 2210/128; G10K 2210/12822; H04R 1/025; H04R 2499/13; H04R 2201/029

(Continued)

(56) References Cited

U.S. PATENT DOCUMENTS 4,032,725 A * 6/1977 McGee .................. H04R 1/025
248/27.1
4,082,159 A * 4/1978 Petty ...................... H04R 1/021
181/153

(Continued)

FOREIGN PATENT DOCUMENTS

DE 102009049280 4/2011

OTHER PUBLICATIONS

Search Report from German counterpart application, including English summary of the examiner's opinion in the search report, dated Mar. 3, 2017.

(Continued)

*Primary Examiner* — Norman Yu
(74) *Attorney, Agent, or Firm* — Carlson, Gaskey & Olds, P.C.

(57) ABSTRACT

A sound generating device is provided on a vehicle to reduce or generate engine sound, and is used in particular for an exhaust system of a combustion engine of the vehicle. The sound generating device has a housing into which a loudspeaker is positioned to divide an inner space of the housing into two sub-spaces separated in a gas-tight manner. A seal rim provides the gas-tight sealing of the loudspeaker towards the housing. An abutment rim positions the loudspeaker in the inner space of the housing. The abutment rim and the seal rim are spaced apart from each other in a direction of a central axis of the loudspeaker. There is also described an exhaust system of a combustion engine of a vehicle with a sound generating device.

24 Claims, 4 Drawing Sheets

(58) Field of Classification Search
USPC ......... 381/86, 71.5, 386, 389, 71.7; 181/171
See application file for complete search history.

(56) References Cited

U.S. PATENT DOCUMENTS

| | | | | |
|---|---|---|---|---|
| 6,005,957 | A * | 12/1999 | Meeks .................... | F01N 1/065 181/171 |
| 2007/0205043 | A1 | 9/2007 | Krueger et al. | |
| 2013/0202148 | A1 | 8/2013 | Grupp et al. | |
| 2015/0071452 | A1 * | 3/2015 | Fenchel .................. | F01N 1/065 381/71.5 |

OTHER PUBLICATIONS

Office Action from Chinese counterpart application, dated Jan. 25, 2019.

* cited by examiner

SOUND GENERATING DEVICE ON A VEHICLE FOR REDUCING OR GENERATING ENGINE SOUND AND EXHAUST SYSTEM

CROSS-REFERENCE TO RELATED APPLICATIONS

This application claims priority to DE 10 2016 107 069.6, filed Apr. 15, 2016.

FIELD OF THE INVENTION

The present invention relates to a sound generating device on a vehicle that is used to reduce or generate engine sound. In particular, the sound generating device is provided on or in an exhaust system of a combustion engine of a vehicle. In addition, the present invention relates to an exhaust system of a combustion engine of a vehicle with a sound generating device as mentioned above.

BACKGROUND

Sound generating devices for exhaust systems are utilized in the prior art, in order to reduce sound emissions of an exhaust system of a combustion engine or to artificially generate a desired engine sound. With respect to the sound generated by the exhaust gas stream, the sound generated by the sound generating device acts as counter-sound in the reduction of sound. The sound generating device for this purpose generates sound on one or more frequencies. This sound is phase-shifted with respect to the sound generated by the exhaust gas stream such that it attenuates the undesired sound emissions or at least eliminates the same at certain frequencies.

A sound generating device as mentioned above is known, for example, from DE 10 2012 201 725 A1. This document is concerned with the manufacture of an active muffler for an exhaust system at comparatively low cost.

In general, a sound generating device comprises a loudspeaker which divides the inner space of the housing into two sub-spaces. A first sub-space is located on that side of the loudspeaker to which the sound generated by the sound generating device is meant to propagate. A second sub-space is usually arranged on the opposite side of the loudspeaker. In this second sub-space, the excitation mechanism for the loudspeaker membrane, which generally comprises the associated electrical connection contacts, also is positioned. The two sub-spaces hence among other things are separated by the loudspeaker membrane.

Since the first sub-space is connected with the exhaust gas-carrying ducts of the exhaust system, the gas-tight sealing of the two sub-spaces serves to seal the second sub-space and thus the connection contacts and the electrical system of the loudspeaker towards the exhaust gas stream. This is necessary to protect the electrical contacts and lines on the rear side of the loudspeaker from corrosion by the chemically aggressive exhaust gases.

This sealing must be ensured over the entire service life of the sound generating device and thus the exhaust system. The attachment and the sealing of the loudspeaker in the housing are therefore of very great importance.

Thus, it is the object of the present invention to create a sound generating device for an exhaust system of a combustion engine of a vehicle, in which the sealing of the loudspeaker towards the housing is improved. In particular, a particularly long-lived sealing should be created. At the same time, there should be created a sound generating device which can be manufactured easily and at low cost.

In addition, a sufficient stiffness and a small overall height must be ensured.

SUMMARY

The present invention provides a generic sound generating device that includes a seal rim that provides gas-tight sealing of a loudspeaker towards a housing and an abutment rim that axially positions the loudspeaker in an inner space of the housing, i.e. in direction of a central axis of the loudspeaker. The abutment rim and the seal rim are axially and also radially spaced apart from each other. The seal rim and the abutment rim can be present either on the loudspeaker, in particular on a loudspeaker basket, or on the housing. The abutment rim and the seal rim are formed, for example, as abutment or sealing surfaces or as abutment or sealing edges. The abutment rim in particular protrudes with respect to the seal rim. Due to the constructive separation of abutment rim and seal rim, a long-lived sealing of the loudspeaker in the housing and hence a long service life of the sound generating device can be ensured, because the seal does not adopt any supporting function.

The invention also creates a sound generating device where the loudspeaker is attached to a central housing part and a largest inside diameter of a sub-space on a rear side of the loudspeaker is larger than an outside diameter of the loudspeaker by at least 25%. This ensures that the sound generating device is constructed very flat in a longitudinal direction, as in particular the longitudinal direction is critical with respect to the installation space.

The sound generating device according to the invention can be mounted on the exhaust system, and optionally the sound can be introduced into the exhaust duct via a pipe conduit, or the sound generating device can be mounted on the vehicle separate from the exhaust system and not emit the sound to the environment via the exhaust system. Preferably, the loudspeaker is attached to a central housing part.

According to one variant, the central housing part comprises a ring-shaped flange section, on which the abutment rim and a seal as well as threaded bolts are arranged. In an interior of the ring-shaped flange section, an opening is provided to pass the sound generated by the loudspeaker. Preferably, the central housing part, at least sectionally, is designed to be funnel or truncated cone-shaped at an outer circumference of the ring-shaped section. There is thus obtained a sound generating device of simple construction and with a long service life.

Advantageously, the flange section has an axially angled opening rim in the area of the opening. The flange section and thus the entire housing thereby is stiffened. Stiffening of the housing by ribs or a thickening in the wall thickness likewise is possible.

According to one aspect, the central housing part on one side is connected with an upper housing part and on an opposite side with a bottom housing part. This three-part housing construction entails an easy assembly of the sound generating device.

In one variant, the bottom housing part has a lateral sound outlet that is connected to an exhaust gas-carrying duct. Via this sound outlet the sound generating device is connected with the exhaust gas-carrying ducts of the exhaust system. Thus, the sound generated by the sound generating device can be superimposed with the sound generated by the exhaust gas stream.

According to one embodiment, the central housing part protrudes into the interior of the housing and forms a part of a partition wall between the sub-spaces. The central housing part can be designed as a shaped sheet-metal part.

Preferably, the seal and the abutment rim rest against a common, planar counter surface. The planar counter surface can be realized either on the housing, in particular on the central housing part, or on the loudspeaker, in particular on the loudspeaker basket. This results in a simple construction of the sound generating device.

To provide a more compact construction in longitudinal direction and at the same time be able to realize a large volume for the sub-space on the rear side of the loudspeaker, the changeover of the central housing part from the outside diameter to the diameter of the abutment surface is effected via a truncated cone-shaped section of the central housing part. The loudspeaker hence partly lies in the depression produced by the truncated cone-shaped section and closer to the sound outlet.

According to one embodiment, the loudspeaker rests against the housing via the abutment rim. Preferably, the loudspeaker directly rests against the housing. This ensures an accurate and simple positioning of the loudspeaker at the housing. In the case of a direct abutment on the housing any intermediate parts can be omitted.

In addition, a seal can be arranged between the seal rim and the housing and a distance between the seal rim and the abutment rim can determine a distance between the seal rim and the housing, wherein the distance between the seal rim and the abutment rim is selected so that the seal is compressed in a defined way. The defined compression of the seal is maintained over the entire service life. In addition, the compression of the seal cannot be influenced by tightening the connection of the loudspeaker in the housing more or less tightly. Hence, the compression of the seal always is the same. This ensures a long service life of the seal and an always optimum sealing effect. In addition, a possible shrinkage of the seal or a change in the elasticity of the sealing material does not influence the connection of the loudspeaker with the housing.

One development provides that the abutment rim and the seal rim are formed, preferably integrally formed, on a loudspeaker basket or a housing part. The loudspeaker basket and the housing part, for example, can be designed as shaped sheet-metal parts. Forming the seal rim and the abutment rim thus can be effected in connection with existing working steps. The abutment rim is, e.g., the axial end of a cylindrical section of the loudspeaker basket or housing part and the seal rim is an adjoining radial shoulder.

Preferably, the loudspeaker is attached to the housing with threaded bolts welded to the housing or to the loudspeaker, and the threaded bolts each pass through a hole arranged on the loudspeaker or on the housing, and preferably are fixed therein by self-locking nuts. In contrast to a connection with two through holes through which the bolts are put, the threaded bolt on one side is welded to the housing or the loudspeaker. This weld is gas-tight. The self-locking nuts are not released even in the case of occurring vibrations, which are quite usual in operation of an exhaust system in a vehicle. Due to the thermal environmental conditions, self-locking nuts preferably are used without a plastic ring. Preferably, the threaded bolts are welded to the housing and pass through holes which are provided at the loudspeaker basket.

In a preferred variant, the holes are arranged radially between the seal rim and the abutment rim and/or the threaded bolts are arranged radially in an area in which the housing is axially spaced apart from the loudspeaker. Thus, a simple construction of the sound generating device is obtained, which only requires little installation space and is easy to mount.

Preferably, between four and twelve threaded bolts are provided, which pass through associated holes. More preferably, five to ten threaded bolts are used. In particular, eight threaded bolts and associated holes are provided.

The nuts preferably are tightened with a torque of 2.5 Nm.

The abutment rim and/or the seal rim substantially can have circumferentially closed geometries and preferably be ring-shaped. Closed geometries in particular include square, polygonal, elliptical, and circular geometries.

Alternatively, the abutment rim does not extend circumferentially, but only in the area around the threaded bolts, in particular in an arc-shaped section around the threaded bolts, where the rim rests against the housing. When the abutment rim lies in a radial plane intersecting the sound outlet opening in direction of the longitudinal axis, the loudspeaker is located very deep in the housing and close to the sound outlet, so that the sub-space on the rear side is increased with respect to the sub-space on the front side.

The seal rim can be located radially within the abutment rim as viewed in the direction of the central axis of the loudspeaker. Alternatively, the seal rim also can be located outside the abutment rim as viewed in the direction of the central axis of the loudspeaker. This results in a compact construction which can be manufactured at low cost.

Alternatively, the abutment rim can comprise several abutment sections. In this alternative, the abutment rim rests against the housing or against the loudspeaker at several discrete points spaced apart from each other. For example, the abutment rim can be formed by several abutment feet. This results in a very light design of the abutment rim.

It is another object of the invention to create an exhaust system which is provided with a sound generating device with an improved service life.

This object is solved by an exhaust system of a combustion engine of a vehicle with a sound generating device according to the invention.

These and other features may be best understood from the following drawings and specification.

DETAILED DESCRIPTION

Figure 1:
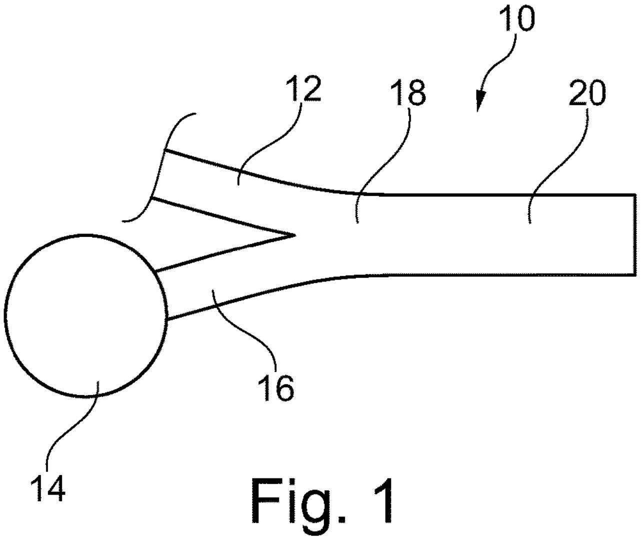
FIG. 1 schematically shows a section of an exhaust system according to the invention with an inventive sound generating device.

FIG. 1 schematically shows an exhaust system 10 of a non-illustrated combustion engine of a vehicle. The exhaust system 10 comprises an exhaust pipe 12 on the side of the combustion engine, which carries exhaust gases coming from the combustion engine.

In addition, the exhaust system 10 comprises a sound generating device 14. In the sound generating device 14 sound is generated, which via a sound line 16 and an orifice 18 is joined with the exhaust gas guided in the exhaust pipe 12 on the side of the combustion engine. Via the orifice 18, the sound line 16 and the exhaust pipe 12 are connected with an exhaust gas-carrying duct 20, which in the illustrated embodiment is designed, e.g., as an exhaust tailpipe.

Figure 2:
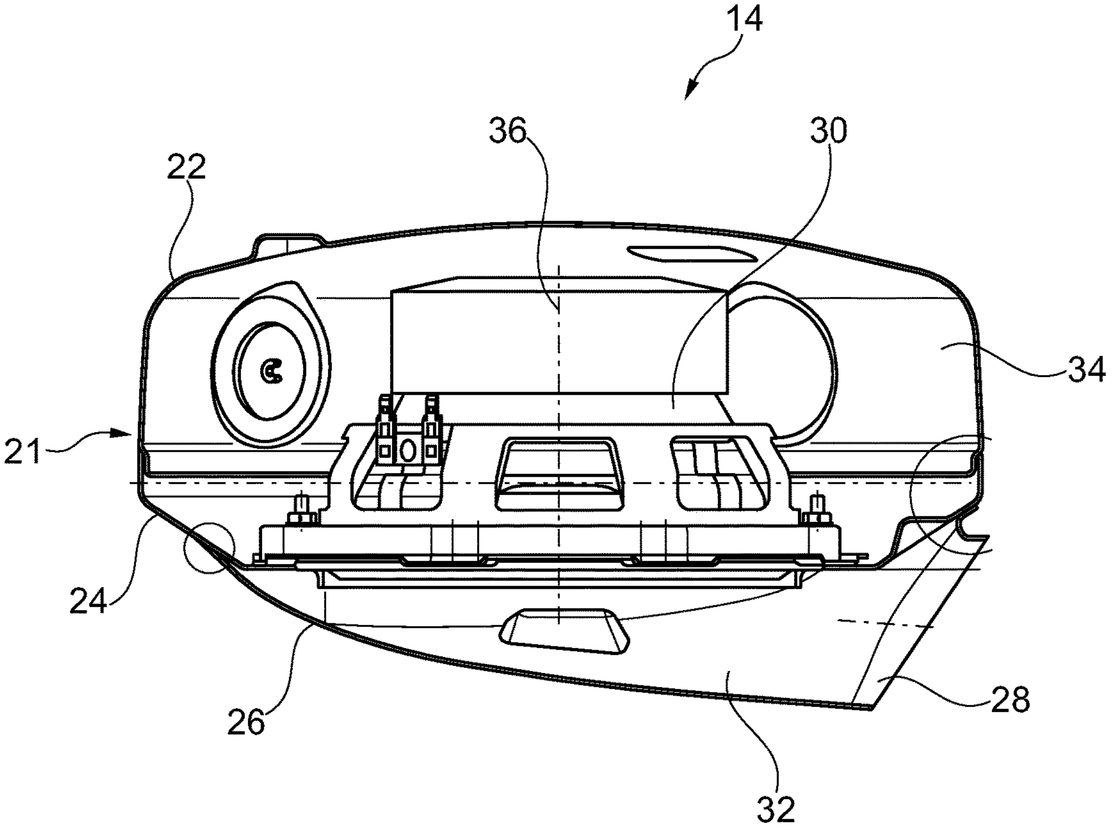
FIG. 2 shows a sound generating device according to the invention in a partly sectional side view.

FIG. 2 shows the sound generating device 14. The sound generating device 14 comprises a housing 21, which comprises a pot-shaped upper housing part 22, a central housing part 24 and a bottom housing part 26.

The individual housing parts 22, 24, 26 preferably are made of metal in one example, in particular of sheet metal, and are connected with each other e.g. by welding, soldering, gluing, folding, screwing, and/or other suitable methods.

At the pot-shaped bottom housing part 26 an oval sound outlet is formed, which is connected with the exhaust gas-carrying duct 20 via the sound line 16.

In the illustrated embodiment, a loudspeaker 30 is attached to the central housing part 24 such that it divides the housing 21 into two sub-spaces 32, 34, a sub-space 34 and 32, respectively, on the rear side and on the front side of the loudspeaker. These sub-spaces 32, 34 are located along a central axis 36 of the loudspeaker 30 on opposite sides of the loudspeaker 30.

The sub-space 32 opens into the sound outlet 28, whereas in the sub-space 34 the electrical connection contacts as well as the excitation mechanism of the loudspeaker 30 are arranged.

The sub-space 34 is gas-tightly separated from the sub-space 32 by the loudspeaker 30 and in part by the central housing part 24.

Figure 3:
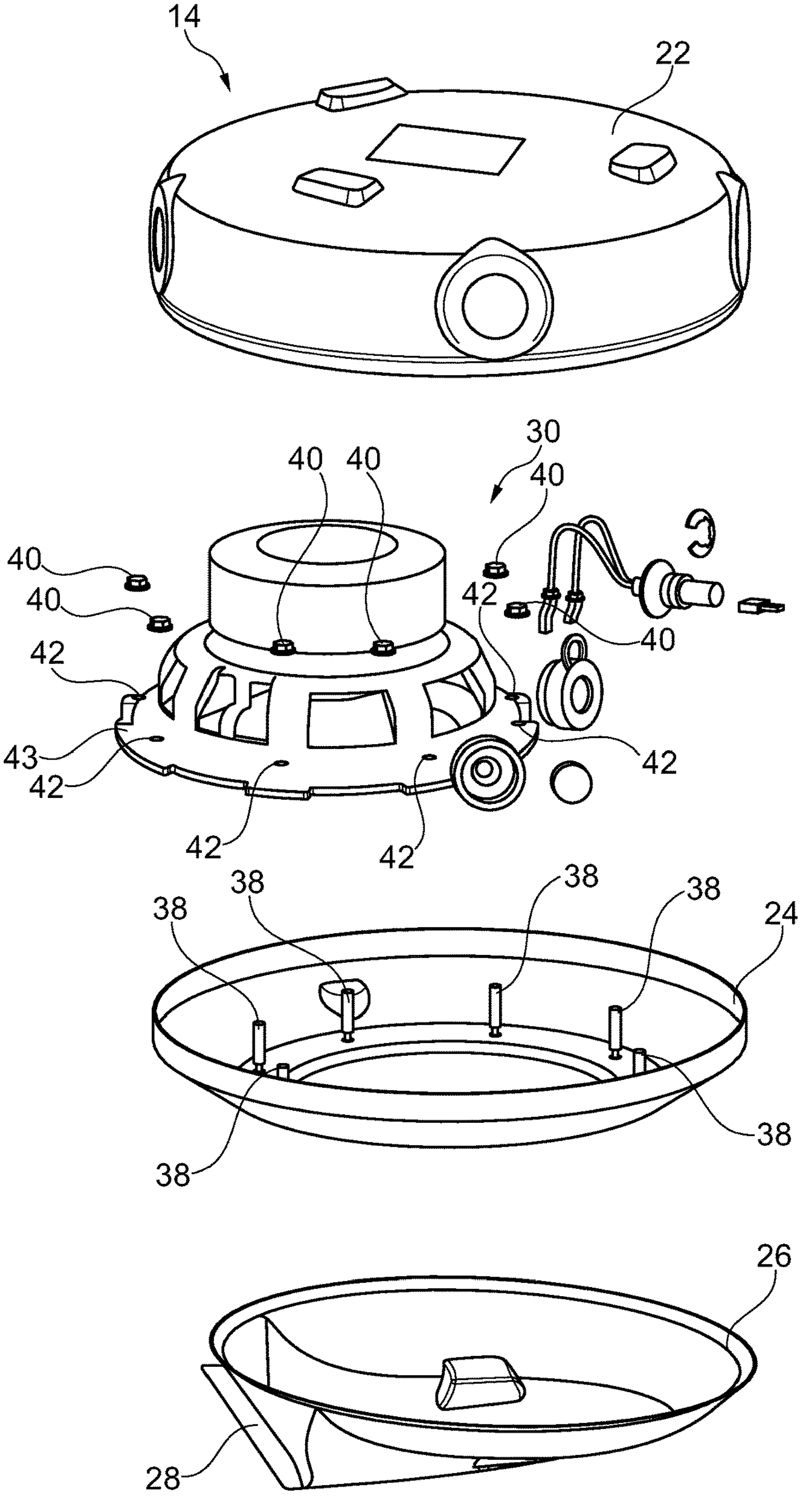
FIG. 3 shows an exploded view of the sound generating device according to the invention as shown in FIG. 2.

FIG. 3 shows the sound generating device 14 in an exploded representation. It can be seen that the loudspeaker 30 is fastened in the funnel-shaped central housing part 24 by threaded bolts 38 and nuts 40, for example. In the illustrated embodiment, six of a total of eight threaded bolts 38 can be seen. The same applies for the nuts 40.

To fasten the loudspeaker 30 the threaded bolts 38 are inserted through holes 42 in the loudspeaker 30 and fixed with the nuts 40. The nuts 40 preferably are designed as self-locking nuts, which preferably do not include any plastic parts. The electrical connection contacts of the loudspeaker 30 likewise are shown in FIG. 3.

In the illustrated embodiment, the holes 42 are arranged on a funnel-shaped, laterally in part open loudspeaker basket 43. In particular, the holes 42 are arranged on a substantially cylindrical section of the loudspeaker basket 43.

Figure 4:
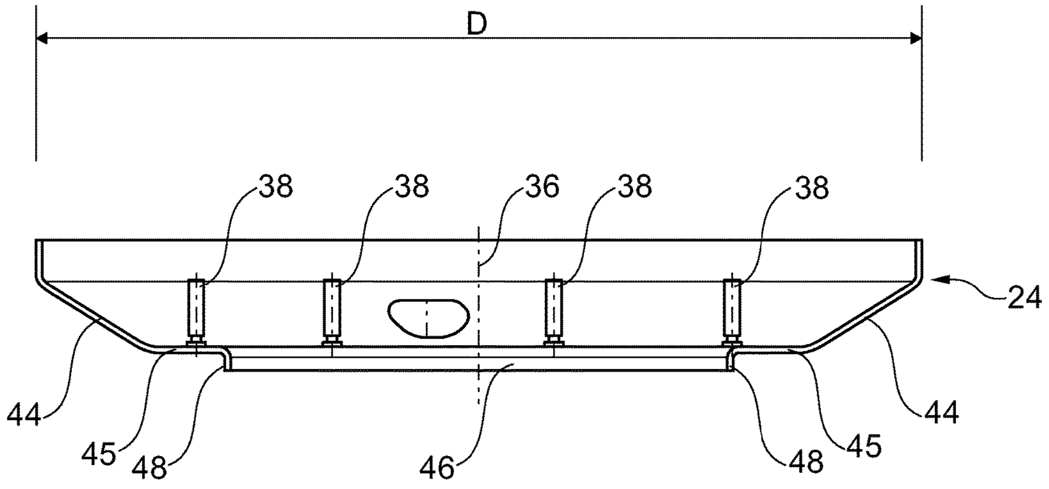
FIG. 4 shows a sectional view of a central housing part of the sound generating device according to the invention as shown in FIG. 3, and FIG. 5 and FIG. 6 show details of the sound generating device according to the invention as shown in FIG. 2.

FIG. 4 shows the central housing part 24 in a sectional view. An outer edge of the central housing part 24 is formed by a cylinder-shaped section. The same is adjoined by a truncated cone or funnel-shaped section 44. The truncated cone-shaped section 44 distinctly protrudes into the bottom housing part. The truncated cone-shaped design stiffens the central housing part 24. The funnel-shaped section 44 changes over into a ring-shaped flange section 45, which is arranged in a plane that is vertical to the central axis 36 of the loudspeaker 30.

The loudspeaker 30 protrudes into a depression formed by the truncated cone-shaped section 44, so that the sub-space 34 can be increased and the axial installation space can be reduced. The flat construction furthermore is achieved in that the largest inside diameter D of the sub-space 34 on the rear side of the loudspeaker 30, here in the region of the central housing part 24, is larger than the outside diameter d (FIG. 6) of the loudspeaker 30, which usually is located in the area of an outer rim 52 (here abutment rim) of the loudspeaker basket 43, by least 25%. Furthermore, in the direction of the longitudinal axis 36 the abutment rim 52 lies in a radial plane of the longitudinal axis 36 intersecting the sound outlet opening 28.

The ring-shaped flange section 45 encloses an opening 46 with an angled opening rim 48. Angling imparts additional stiffness to the central housing part 24 and hence to the entire housing 21.

On the ring-shaped flange section 45, the threaded bolts 38 are arranged and welded to the ring-shaped flange section 45. The tightness of the ring-shaped flange section 45 is not impaired by the threaded bolts 38. The threaded bolts 38 substantially extend parallel to the central axis 36 of the loudspeaker 30.

The synopsis of FIG. 4 with FIG. 3 also reveals that the opening 46 is arranged such that the sound generated by the loudspeaker 30 can pass through this opening 46 and is guided from the bottom housing part 26 in the direction of the sound outlet 28.

Figure 5:
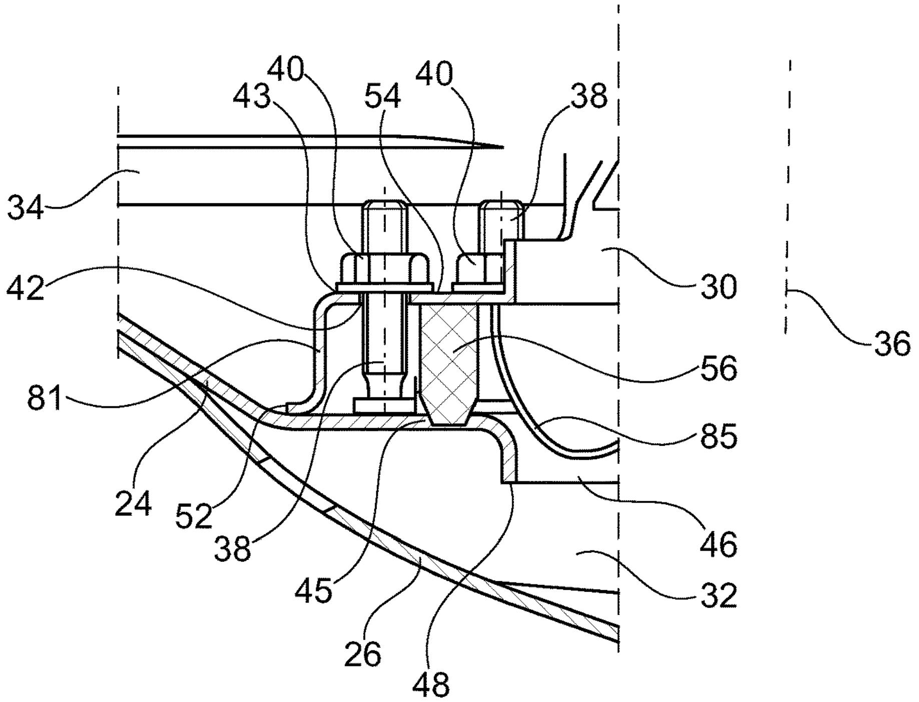

FIG. 5 shows a part of the ring-shaped flange section 45 in a sectional view. In addition, the screw connection of the loudspeaker 30 with the housing 21 and the sealing of the loudspeaker 30 towards the housing 21 can be seen in detail.

Like in FIG. 3, the holes 42 through which the threaded bolts 38 pass are arranged on the loudspeaker basket 43. The threaded bolts 38 are secured in the holes 42 with the nuts 40.

In addition, the abutment rim 52 and a seal rim 54 are provided at the loudspeaker basket 43. The abutment rim 52 is axially, i.e. in the direction of the loudspeaker middle axis 36, spaced apart from the seal rim 54, wherein the abutment rim 52 and the seal rim 54 preferably lie in parallel planes.

The abutment rim 52 rests against the central housing part 24, hence against the housing 21, directly, i.e. without any intermediate elements. Via the abutment rim 52 the loudspeaker 30 is positioned in the housing 21.

Since the abutment rim 52 directly rests against the central housing part 24 or more exactly against the ring-shaped flange section 45 of the central housing part 24 in a circumferentially closed manner, the distance between the abutment rim 52 and the seal rim 54 corresponds to the distance of the seal rim 54 from the central housing part 24 or more exactly from the ring-shaped flange section 45 of the central housing part 24.

A closed ring-shaped seal 56 is provided between the seal rim 54 and the ring-shaped flange section 45 of the central housing part 24. The seal 56 thus seals the loudspeaker 30 towards the housing 21.

In the representation of FIG. 5 the seal 56 is compressed so that it fills the area between the seal rim 54 and the ring-shaped flange 45 under tension. Since the distance between the seal rim 54 and the abutment rim 52 is fixed, the compression of the seal 56 is a defined compression.

In particular, the compression of the seal 56 is not dependent on how firmly the loudspeaker 30 is screwed to the central housing part 24 with the nuts 40 and the threaded bolts 38. It merely is important that the abutment rim 52 rests against the central housing part 24.

The seal 56 possibly can be loose or vulcanized onto the seal rim 54, but preferably is integrated in one part into a so-called loudspeaker bead 85 (FIG. 5) to whose radially inner side the loudspeaker membrane (not shown) in turn is glued.

Conversely, the flow of force generated by the screw connection of the loudspeaker 30 with the central housing part 24 does not go through the seal 56, but through the section of the loudspeaker 30, more exactly of the loudspeaker basket 43, which faces the abutment rim 52. The strength of the screw connection hence is independent of a possible change of the elasticity of the seal 56 or a possible shrinkage of the seal 56.

In summary, the positioning of the loudspeaker 30 at the housing 21 hence is independent of the sealing of the loudspeaker 30 with respect to the housing 21.

In the illustrated embodiment, the threaded bolts 38 and the holes 42 are arranged between the seal rim 54 and the abutment rim 52 in a radial direction as seen with respect to the central axis 36 of the loudspeaker. The seal rim 54 is located radially within the abutment rim 52.

In addition, in the region of the threaded bolts 38, the housing 21, more exactly the central housing part 24, is spaced apart from the loudspeaker 30, more exactly from the loudspeaker basket 43.

In the illustrated embodiment, the abutment rim 52, the seal 56 and the threaded bolts 38 are arranged on the ring-shaped flange section 45. This ring-shaped flange section 45 hence forms a common, planar counter surface for the seal 56 and the abutment rim 52.

It can also be seen that the central housing part 24 protrudes into the interior of the housing 21 and thus together with the loudspeaker 30 forms a partition wall between the sub-spaces 32, 34. Of course, the abutment rim 52 and the seal rim 54 also can be present at the central housing part 24, and the loudspeaker 30, more exactly the loudspeaker basket 43, is flat to form an associated counter surface. Furthermore, the threaded bolts 38 can then be welded to the loudspeaker 30 or to the loudspeaker basket 43.

Figure 6:
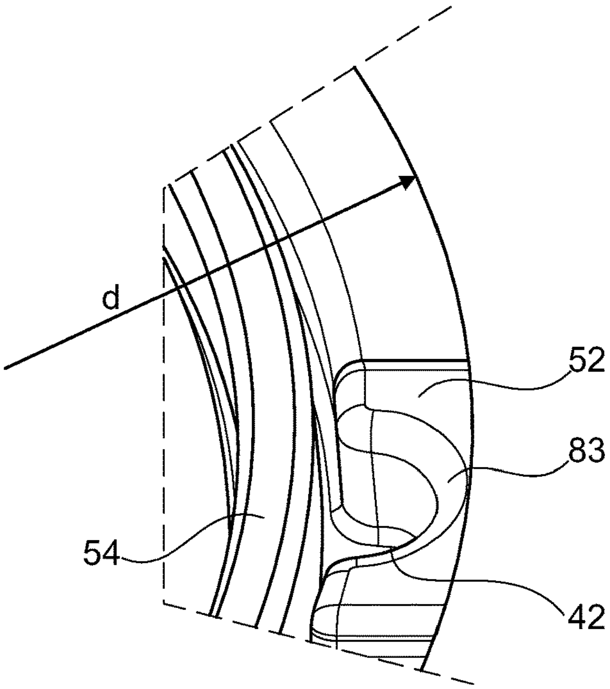

In FIG. 6, the abutment rim 52 and the seal rim 54 are shown in a perspective representation. The loudspeaker 30 and hence also the loudspeaker basket 43 are designed substantially round. Around each stay bolt an arc-shaped abutment rim 52 is formed, with which alone the loudspeaker basket 43 rests against the central housing part 24. Between the arc-shaped abutment rims 52 a minimum gap is present towards the central housing part 24. This should result in freedom from clatter. As an alternative, the abutment rim 52 can of course also extend around the loudspeaker circumference in a ring-shaped closed manner. The seal rim 54 always extends in a substantially ring-shaped manner, wherein the ring is a circular ring. The seal rim 54 has a closed circumferential geometry. Around the stay bolts the axially angled section 81 of the loudspeaker basket 43 extends substantially cylindrically, like a half-pipe. In FIG. 6 this half-pipe bears the reference numeral 83.

The half-pipe 83 is the part of the loudspeaker basket 43 compressed via the stay bolts.

The sound generating device alternatively can be attached to the exhaust system without opening into the exhaust branch with the sound outlet opening and thus directly emitting the sound for generating another engine sound or for reducing the engine noise, wherein for this purpose the sound generating device alternatively can also be accommodated at other points of the vehicle.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A sound generating device on a vehicle to reduce or generate engine sound, in particular for an exhaust system of a combustion engine of a vehicle, comprising:

a housing into which a loudspeaker is attached so that the loudspeaker divides an inner space of the housing into two sub-spaces separated from each other in a gas-tight manner;

a seal rim to provide gas-tight sealing of the loudspeaker towards the housing;

a seal arranged between the seal rim and the housing, wherein the seal does not adopt any supporting function such that a flow of force generated by a connection of the loudspeaker to the housing does not go through the seal but through the abutment rim; and an abutment rim to axially position the loudspeaker in the inner space of the housing, and wherein the abutment rim and the seal rim are axially spaced apart from each other and/or wherein the loudspeaker is attached to a central housing part and a largest inside diameter of the sub-space on a rear side of the loudspeaker is larger than a largest outside diameter of the loudspeaker by at least 25%.

2. The sound generating device according to claim 1, wherein the central housing part comprises a ring-shaped flange section on which the abutment rim and the seal as well as threaded bolts are arranged, and wherein an interior of the ring-shaped flange section is provided with an opening to pass the sound generated by the loudspeaker.

3. The sound generating device according to claim 2, wherein the central housing part on an outer circumference of the ring-shaped flange section is at least sectionally designed as a funnel or truncated cone-shape.

4. The sound generating device according to claim 2, wherein in an area of the opening the ring-shaped flange section has an axially angled opening rim.

5. The sound generating device according to claim 1, wherein the central housing part on one side is connected with an upper housing part and on an opposite side with a bottom housing part.

6. The sound generating device according to claim 5, wherein the bottom housing part has a lateral sound outlet that is connected to an exhaust gas-carrying duct.

7. The sound generating device according to claim 1, wherein the central housing part protrudes into an interior of the housing and forms a part of a partition wall between the two sub-spaces.

8. The sound generating device according to claim 1, wherein the central housing part includes a truncated cone-shaped section that extends from the largest inside diameter to a ring-shaped flange section on which the abutment rim rests.

9. The sound generating device according to claim 1, wherein the loudspeaker rests against the housing via the abutment rim.

10. The sound generating device according to claim 1, wherein a distance between the seal rim and the abutment rim determines a distance between the seal rim and the housing, wherein the distance between the seal rim and the abutment rim is selected so that the seal is compressed in a defined way.

11. The sound generating device according to claim 1, wherein the abutment rim and the seal rim are formed on a section of a loudspeaker basket or of a housing part of the housing.

12. The sound generating device according to claim 1, wherein the loudspeaker is attached to the housing with threaded bolts that are welded to the housing, and wherein the threaded bolts each pass through a hole arranged on the loudspeaker and are fixed therein, or wherein the loudspeaker is attached to the housing with threaded bolts that are welded to the loudspeaker, and wherein the threaded bolts each pass through a hole arranged on the housing and are fixed therein.

13. The sound generating device according to claim 12, wherein the holes are arranged radially between the seal rim and the abutment rim, and/or the threaded bolts are arranged radially in an area in which the housing is axially spaced apart from the loudspeaker.

14. The sound generating device according to claim 1, wherein the abutment rim and/or the seal rim have closed geometries and/or that the seal rim is located radially within the abutment rim as viewed in a direction of a central axis of the loudspeaker.

15. The sound generating device according to claim 12, wherein the abutment rim does not extend in a circumferentially closed manner, but rests against the housing only in an area around the threaded bolts.

16. The sound generating device according to claim 12, wherein the abutment rim rests against the housing in an arc-shaped section around the threaded bolts.

17. The sound generating device according to claim 1, wherein the seal and the abutment rim rest against a common, planar counter surface.

18. The sound generating device according to claim 1, wherein, in a direction of a longitudinal axis, the abutment rim lies in a radial plane intersecting a sound outlet opening.

19. An exhaust system of a combustion engine of a vehicle comprising:

a sound generating device connected to an exhaust gas-carrying duct; and the sound generating device comprises a housing into which a loudspeaker is attached so that the loudspeaker divides an inner space of the housing into two sub-spaces separated from each other in a gas-tight manner, a seal rim to provide gas-tight sealing of the loudspeaker towards the housing, a seal arranged between the seal rim and the housing, wherein the seal does not adopt any supporting function such that a flow of force generated by a connection of the loudspeaker to the housing does not go through the seal but through the abutment rim, and an abutment rim to axially position the loudspeaker in the inner space of the housing, and wherein the abutment rim and the seal rim are axially spaced apart from each other and/or wherein the loudspeaker is attached to a central housing part and a largest inside diameter of the sub-space on a rear side of the loudspeaker is larger than a largest outside diameter of the loudspeaker by at least 25%.

20. A sound generating device on a vehicle to reduce or generate engine sound, in particular for an exhaust system of a combustion engine of a vehicle, comprising:

a housing having a truncated cone-shaped section that extends from an outside diameter to a ring-shaped flange section that includes an opening that surrounds a central axis;

a loudspeaker attached to the housing so that the loudspeaker divides an inner space of the housing into two sub-spaces separated from each other in a gas-tight manner, and wherein the loudspeaker comprises a base and a funnel-shaped loudspeaker basket that extends radially outwardly from the base to terminate at an abutment rim that rests against the ring-shaped flange section to axially position the loudspeaker in the inner space of the housing; and wherein the loudspeaker includes a seal rim to provide gas-tight sealing of the loudspeaker to the housing, and wherein the abutment rim and the seal rim are axially spaced apart from each other in a direction that extends along the central axis, and/or wherein a largest inside diameter of the sub-space on a rear side of the loudspeaker is larger than an outside diameter of the abutment rim by at least 25%.

21. The sound generating device according to claim 20, wherein the loudspeaker and housing are attached to each other via threaded fasteners that are welded to one of the loudspeaker or housing and that are inserted through corresponding holes in the other of the loudspeaker or housing.

22. The sound generating device according to claim 21, including a seal extending axially from the ring-shaped flange section to the seal rim, and wherein the threaded fasteners are positioned radially between the seal and the abutment rim.

23. The exhaust system according to claim 19, wherein the loudspeaker comprises a base and a funnel-shaped loudspeaker basket that extends radially outwardly from the base to terminate at the abutment rim that rests against a ring-shaped flange section of the housing to axially position the loudspeaker in the inner space of the housing.

24. The sound generating device according to claim 1, wherein the loudspeaker comprises a base and a funnel-shaped loudspeaker basket that extends radially outwardly from the base to terminate at the abutment rim that rests against a ring-shaped flange section of the housing to axially position the loudspeaker in the inner space of the housing.

* * * * *